United States Patent
Ricker

(10) Patent No.: US 7,654,055 B2
(45) Date of Patent: Feb. 2, 2010

(54) GLUELESS PANEL LOCKING SYSTEM

(76) Inventor: Michael B. Ricker, 4711- 67th Pl., Kenosha, WI (US) 53142

( * ) Notice: Subject to any disclaimer, the term of this patent is extended or adjusted under 35 U.S.C. 154(b) by 446 days.

(21) Appl. No.: 11/500,605

(22) Filed: Aug. 8, 2006

(65) Prior Publication Data

US 2008/0053029 A1    Mar. 6, 2008

(51) Int. Cl.
*E04B 5/00* (2006.01)
(52) U.S. Cl. .................. 52/592.1; 52/582.2; 52/586.1; 52/591.1
(58) Field of Classification Search .......... 52/586.2, 52/591.2, 586.1, 589.1, 582.2, 587.1, 588.1, 52/592.1, 591.1; 403/331, 290, 381
See application file for complete search history.

(56) References Cited

U.S. PATENT DOCUMENTS

| 1,430,423 | A |   | 9/1922 | Weichold |
| 2,021,490 | A | * | 11/1935 | Rigandi ............... 403/251 |
| 2,947,040 | A | * | 8/1960 | Schultz ............... 52/592.4 |
| 3,946,529 | A |   | 3/1976 | Chevaux |
| 4,095,462 | A | * | 6/1978 | Goto ............... 73/114.72 |
| RE30,154 | E | * | 11/1979 | Jarvis ............... 403/290 |
| 4,249,355 | A | * | 2/1981 | Anderson et al. ......... 52/590.1 |

(Continued)

FOREIGN PATENT DOCUMENTS

GB    2256023 A    11/1992

WO    WO 96/27721    9/1996

OTHER PUBLICATIONS

FastFloors.com, Wood Flooring Installation Methods, undated, 3 pages. <www.fastfloors.com/articles/wood_flooring_installation_methods>.

(Continued)

*Primary Examiner*—Richard E Chilcot, Jr.
*Assistant Examiner*—Anthony N Bartosik
(74) *Attorney, Agent, or Firm*—Jansson Shupe & Munger Ltd.

(57) ABSTRACT

A locking system for mechanically joining a plurality of panels or components of an article of construction without the need for glue or other adhesive is provided. The panels are preferably solid hardwood flooring panels. Each panel includes first and second locking members spaced beneath its outer surface. The first locking member is at one side edge of the panel and has two spaced-apart flexible arm portions, at least one arm portion including a first latching member. Preferably, the first latching member is a rib extending outward from the arm portion. The second locking member is at another side edge and includes a channel recessed within the side edge. The channel is sized to receive the arm portions without them having to contact the channel unless deflected within the channel. The second locking member also includes a second latching member positioned and adapted to engage the first latching member. The second latching member is preferably a slot abutting the channel. At least one of the locking members is provided with a positioning member so that upon inserting the first locking member on one panel into the second locking member on another panel for joining them together, the positioning member deflects an arm portion to securely engage the first latching member with the second latching member. The positioning member is preferably a wedge mounted to the back wall of the channel.

25 Claims, 5 Drawing Sheets

U.S. PATENT DOCUMENTS

| | | | |
|---|---|---|---|
| 4,426,820 | A | 1/1984 | Terbrack et al. |
| 4,769,963 | A | 9/1988 | Meyerson |
| 5,247,773 | A * | 9/1993 | Weir .......................... 52/592.3 |
| 5,295,341 | A | 3/1994 | Kajiwara |
| 5,323,584 | A * | 6/1994 | Scarlett ........................ 52/841 |
| 5,657,604 | A * | 8/1997 | Malott ........................ 52/655.1 |
| 6,006,486 | A | 12/1999 | Moriau et al. |
| 6,101,778 | A | 8/2000 | Martensson |
| 6,314,701 | B1 * | 11/2001 | Meyerson .................. 52/588.1 |
| 6,332,733 | B1 | 12/2001 | Hamberger et al. |
| 6,418,683 | B1 | 7/2002 | Martensson et al. |
| 6,421,970 | B1 | 7/2002 | Martensson et al. |
| 6,430,880 | B1 * | 8/2002 | Kemeny ........................ 52/71 |
| 6,536,178 | B1 | 3/2003 | Palsson et al. |
| 6,564,522 | B1 | 5/2003 | Chiu-Ying |
| 6,588,166 | B2 | 7/2003 | Martensson et al. |
| 6,591,568 | B1 | 7/2003 | Palsson |
| 6,601,359 | B2 | 8/2003 | Olofsson |
| 6,606,834 | B2 | 8/2003 | Martensson et al. |
| 6,647,689 | B2 | 11/2003 | Pletzer et al. |
| 6,647,690 | B1 | 11/2003 | Martensson |
| 6,691,480 | B2 | 2/2004 | Garcia |
| 6,715,253 | B2 | 4/2004 | Pervan |
| 6,722,809 | B2 | 4/2004 | Hamberger et al. |
| 6,729,091 | B1 * | 5/2004 | Martensson .................. 52/391 |
| 6,766,622 | B1 | 7/2004 | Thiers |
| 6,769,218 | B2 | 8/2004 | Pervan |
| 6,772,568 | B2 | 8/2004 | Thiers et al. |
| 6,851,241 | B2 | 2/2005 | Pervan |
| 6,854,235 | B2 | 2/2005 | Martensson |
| 6,860,074 | B2 | 3/2005 | Stanchfield |
| 6,863,768 | B2 | 3/2005 | Haffner et al. |
| 6,865,855 | B2 | 3/2005 | Knauseder |
| D504,181 | S | 4/2005 | Stanchfield |
| D504,730 | S | 5/2005 | Kornfalt et al. |
| D504,731 | S | 5/2005 | Stanchfield |
| D505,211 | S | 5/2005 | Stanchfield |
| 6,898,911 | B2 | 5/2005 | Kornfalt et al. |
| 6,898,913 | B2 | 5/2005 | Pervan |
| 6,918,220 | B2 | 7/2005 | Pervan |
| 6,966,161 | B2 | 11/2005 | Palsson et al. |
| 6,968,663 | B2 | 11/2005 | Thiers et al. |
| 6,968,664 | B2 | 11/2005 | Thiers et al. |
| 7,021,019 | B2 * | 4/2006 | Knauseder .................. 52/588.1 |
| 7,131,242 | B2 | 11/2006 | Martensson et al. |
| 2002/0152707 | A1 | 10/2002 | Martensson |
| 2002/0178680 | A1 | 12/2002 | Martensson et al. |
| 2004/0035077 | A1 | 2/2004 | Martensson et al. |
| 2004/0055243 | A1 * | 3/2004 | Yeh .......................... 52/592.1 |
| 2004/0182036 | A1 | 9/2004 | Sjoberg et al. |
| 2005/0003132 | A1 | 1/2005 | Blix et al. |
| 2005/0016107 | A1 * | 1/2005 | Rosenthal et al. ............. 52/578 |
| 2007/0028547 | A1 * | 2/2007 | Grafenauer et al. ........ 52/586.1 |

OTHER PUBLICATIONS

Helm, Darius. "While the Economy Stalled, Hardwood Flooring Sales Continued to Soar." Floor Focus Magazine. Aug./Sep. 2002.
Hosking Hardwood, All About Engineered Wood Floors, undated, 4 pages. <www.hoskinghardwood.com/engineered-wood-floors.asp>.
Hosking Hardwood, All About Floating Wood Floors, undated, 4 pages. <www.hoskinghardwood.com/floating-wood-floors.asp>.
Hosking Hardwood, All About Solid Wood Flooring, undated, 4 pages. <www.hoskinghardwood.com/solid-wood-flooring.asp>.
Webstream Dynamics, LLC, Floor Facts: Hardwood Floors, undated, 2 pages. <www.floorfacts.com/compare/hardwood-floors.html>.
Webstream Dynamics, LLC, Floor Facts: Laminate Floors, undated, 2 pages. <www.floorfacts.com/compare/laminate-floors.html>.

* cited by examiner

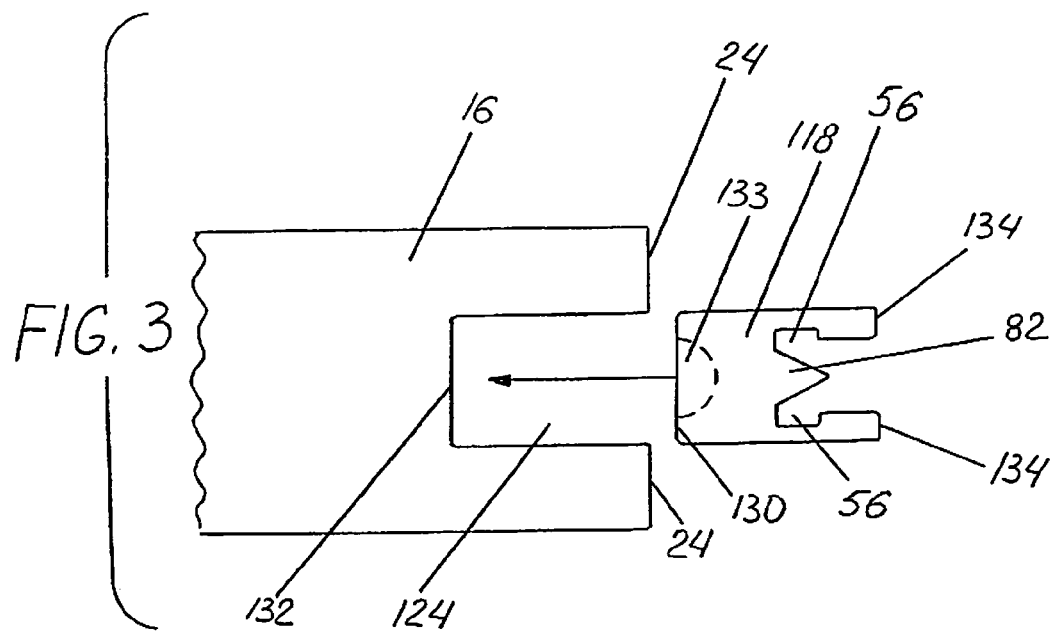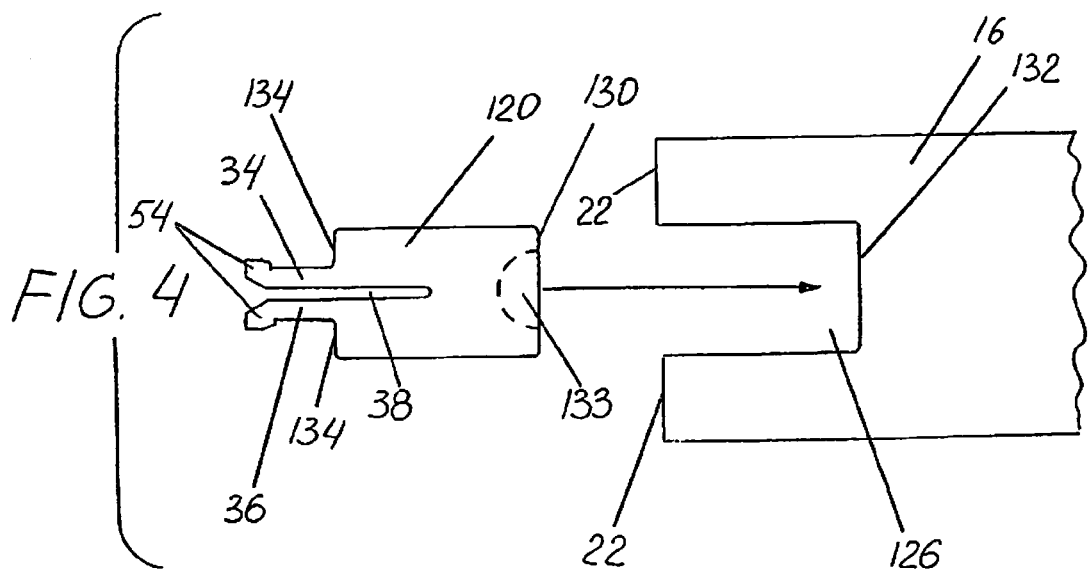

GLUELESS PANEL LOCKING SYSTEM

FIELD OF THE INVENTION

This invention is related generally to mechanical locking system for paneling and, more particularly, to mechanical locking systems for hardwood flooring not requiring the use of adhesive or other fasteners.

BACKGROUND OF THE INVENTION

Hardwood flooring is a $2.4 billion dollar a year industry that has been growing at a rate of more than 10% a year. Hardwood floors represent an excellent value in comparison to other flooring options since they never have to be replaced and have been shown to enhance and even increase the value of the homes in which they are installed.

The current hardwood market consists of two types of products: solid and engineered. Solid flooring is generally ¾" thick, and, as the name implies, it is made of solid hardwood. This type of product currently represents about 60% of the market or 550,000,000 square feet per year. Solid flooring includes a thick top layer that can be sanded and refinished new again several times. As a result, solid wood floors have been known to last well over 100 years. In addition, solid flooring with its ¾" thickness adds structural strength to any floor system.

All types of solid flooring react, however, to the presence of moisture. In the dry winter months, moisture leaves the wood causing the floor panels or boards to contract slightly in size, leaving unsightly gaps between each board. In the more humid summer months, the wood expands and with too much moisture, the boards may even cup or buckle. For this reason, solid flooring is not recommended for installation below ground level or directly over a concrete slab.

Solid wood floors are therefore intended for nail-down installation only, leaving a proper expansion area around the perimeter of each board given the instability of the wood. Gluing solid flooring directly to any surface including a sub-floor is not desirable because the adhesive does not allow the wood to move or breathe normally, causing the flooring to distort.

Engineered flooring is made of plywood that has been configured in a cross-ply pattern to make the product more stable by decreasing the amount of expansion and contraction the flooring experiences during changes in humidity from one season to another. This type of hardwood is roughly 40% of the market.

Engineered hardwood has been growing faster than solid hardwood for the last couple of years for several reasons. Recent new home construction has been strongest in the South and West. These markets are predominantly "slab" markets where the houses are built on concrete slabs without a basement underneath. This trend toward slab construction is expected to continue for at least the next decade as the number of retired affluent households moving to these regions of the country increases. Since engineered flooring is thinner and more stable, engineered boards can be glued-down directly to the concrete.

Engineered flooring can also be floated over the concrete or any other type of sub-floor. With this manner of installation, the engineered boards rest on top of the sub-floor and are never secured or fastened to the substrate beneath them. Since the individual boards are glued or otherwise secured to each other and not to the sub-floor, the floor expands and contracts as a whole, leaving no gaps or spaces between pieces. Given the increase in slab construction, engineered hardwood floating systems have grown in popularity. With a floating installation, a moisture barrier can also be placed between the concrete slab and the engineered boards. Not only do such systems offer excellent stability but their high speed of installation represent lower costs to the homeowner.

The move in the industry now is toward glueless floating systems. Specially designed tongue-and-groove interlocking systems allow the boards to be snapped together by compressing one coupling part so that it engages the other. High pressure laminate floors have been converted almost entirely to glueless floating systems over the last 6 years.

Engineered hardwood flooring, like laminate flooring, is, however, not easily repaired. Engineered boards have a thin hardwood surface layer no more than one-eighth of an inch thick. Once this layer goes, so does the floor. Unlike engineered flooring, any wood present above the level plane with solid hardwood floors can be sanded-down to allow the floor to span slight imperfections in the sub-floor. Engineered boards are more expensive than comparable solid flooring and are unavailable in the longer lengths in which solid hardwood boards are made, adding to the time and cost of installation of engineered wood floors. A glueless floating system for solid hardwood flooring, therefore, would be highly desirable in the large and growing hardwood flooring industry.

The dominant system currently in use to float solid flooring uses metal clips fastened to the back of the boards to hold the boards together in groups of three or more. This system is time-consuming and creates gaps between the boards during the heating/low humidity season. In addition, the technicians who install ¾" solid flooring prefer to work from a standing position. Installers therefore resist using the clip system because it requires a different installation technique than the one to which they are accustomed. Since most installers are paid by the foot, they will naturally embrace that technique at which they are the fastest and most effective.

Moreover, solid hardwood flooring is unable to utilize the interlocking technology found on engineered and laminate flooring for a number of reasons. The ¾" solid flooring boards are not straight enough to engage the entire edge at one time. This is required with certain tongue-and-groove systems where one coupling element must be engaged by the other at an angle and then rotated into position. Solid hardwood has what is referred to as a "crook" or warp. Thus, the flooring must be engaged at one end of the edge first, the remaining portion of the board being engaged as the installer moves along the length of the board. Any locking system for achieving a floating installation of solid hardwood floors must therefore be capable of being engaged in a direct, i.e., horizontal, manner where the engagement is by one section of a given edge at a time.

The present interlocking systems also create waste on both the tongue and groove sides of the board. Milling the profile of the individual coupling elements can consume over 10% of the panel itself. In addition, there is loss of the full face of each floor board, requiring an overlap of the boards and a reduction of the amount of usable product. This is not critical when the substrate is inexpensive plywood or fiberboard. When expensive hardwood is being used, however, the financial ramifications are significant. It is very important when making alterations to or otherwise working with an expensive material such as hardwood so as to create an interlocking structure that as little of the material be used as possible.

As explained above, solid hardwood flooring is also far less dimensionally stable than plywood or fiberboard. Even slight dimensional changes in the profile of the interlocking structures presently found in the prior art that arise due to such factors as a change in humidity has the potential of rendering the intended system of securing one board with another entirely useless.

Moreover, some current interlocking systems developed for the laminate industry have profiles where a tongue with protrusions is forced into a groove that is narrower than the height of these protrusions. These systems will not work with solid hardwood flooring because the shoulders of the groove become fractured as the tongue is forced into position. These fractures can be seen on the finished flooring since the fracture is telegraphed to the exposed upper surface. In fact, even with the high pressure laminate flooring, most of these systems where the groove is forced to open wider in order to accept the tongue have been found to fail in actual practice.

There is a significant need, therefore, for an improved locking system for mechanically joining panels that would allow solid hardwood flooring to be installed in a floating manner over a wide variety of sub-floor surfaces including concrete slabs. A locking system that accomplishes this without the need for fasteners such as nails or glue and other adhesives to hold the boards together would be even more highly desirable. This invention meets those needs and overcomes the above problems and shortcomings in the present art in a simple and inexpensive manner.

OBJECTS OF THE INVENTION

It is a primary object of this invention to provide a novel panel locking system that overcomes some of the problems and shortcomings of the prior art.

Another object of this invention is to provide an improved panel locking system having a profile that can either be milled into the structure of each panel itself or extruded/milled from another substance and applied to a groove in the edge of the panel for versatility and reduced production expense.

Another object of the invention is to provide an excellent panel locking system that reduces the amount of material removed from the panel itself and preserves its full face, thereby avoiding any need for overlap between the panels by utilizing the full face of each individual panel.

Another object of the invention is to provide an exceptional panel locking system that permits a solid hardwood floor to be installed in a traditional manner where the installer taps the panels together along the horizontal plane of the sub-flooring with a mallet and eliminates the need for the installer to nail or staple each panel into place.

Another object of the invention is to provide a novel panel locking system that allows for the positioning of a sound retardant and/or moisture barrier sheet between the sub-flooring and a solid hardwood floor to reduce sound transmission and the movement of moisture through the flooring.

Another object of the invention is to provide an improved panel locking system that holds each row of flooring together directly at the joint to eliminate gapping from any expansion and contraction of the individual panels.

Another object of the invention is to provide an excellent panel locking system that operates in an active rather than static manner by utilizing a tongue that enters the corresponding groove without causing stress or damage to the shoulders of the groove and that allows the panels to be attached one section of each side at a time.

Another object of the invention is to provide an exceptional panel locking system that can be practiced using standard molding and routing machinery for simple and inexpensive construction.

Yet another object of the invention is to provide a desirable panel locking system that permits solid hardwood flooring to be installed without glue or other adhesives in an efficient and highly reliable manner.

SUMMARY OF THE INVENTION

This invention is for a panel locking system to be used for mechanically joining a plurality of panels. Each panel includes first and second locking members spaced beneath its outer surface. The first locking member is positioned at a first side edge of the panel and has first and second flexible arm portions that are spaced apart, at least the first arm portion including a first latching member. A second side edge is provided with the second locking member. The second locking member defines a channel recessed within the second side edge where the channel is in registry with the arm portions and is sized to receive the arm portions without the arm portions contacting the channel unless there is deflection of one or more of the arm portions. The second locking member also includes a second latching member that is positioned and adapted to engage the first latching member. At least one of the locking members is provided with a positioning member so that upon inserting the first locking member on one panel into the second locking member on another panel for joining them together, the positioning member deflects the first arm portion to securely engage the first latching member with the second latching member. The panels are preferably solid hardwood flooring panels.

In certain exceptional embodiments, the positioning member is a wedge with at least one deflecting-surface. When the first locking member is inserted into the second locking member, the deflecting-surface makes contact with the first arm portion and deflects it away from the second arm portion towards the second latching member. More desirable is when the wedge is positioned within the channel. Most preferred is where the wedge is abutting the back wall of the channel.

A highly preferred embodiment finds the first latching member to be at least one rib extending outward from the first arm portion and the second latching member to be at least one slot abutting the channel that is sized and positioned along the channel to receive the rib. Also highly desired is when the first latching member includes a second rib extending outward from the second arm portion and the second latching member includes a second slot abutting the channel, the second slot being sized and positioned to receive the second rib. Most preferred is where the ribs extend a length of the first side edge and the slots extend a length of the second side edge.

In certain desirable cases, the first rib is positioned on an upper surface of the first arm portion and the second rib is positioned on a lower surface of the second arm portion. Most desirable is where the first and second ribs are aligned substantially opposite to each other. In these embodiments, it is highly preferred that the first and second ribs be positioned at the respective distal end of their corresponding arm portion.

Another embodiment that is much preferred finds the first slot recessed within an upper surface of the channel and the second slot recessed within its lower surface, both slots having a slot-surface. In addition, each rib has a rib-surface that is configured to be received and to substantially abut its corresponding slot-surface.

One desirable embodiment finds the first latching member to be at least one rib extending outward from the first arm portion, the first arm portion having a contact-surface at its distal end abutting the surface opposite to the rib. Highly preferred is where the contact-surface has a distal edge and the distal edge is the portion making initial contact with the deflecting-surface when the first locking member is inserted into the second locking member.

In other preferred embodiments, the arm portions are spaced apart by a kerf and each extends outward from the first side edge to a distal end. The kerf itself extends from the point of these distal ends to a proximal-vertex that is recessed within the panel. More preferred is where the kerf has a proximal portion that extends from the proximal-vertex to the first side edge as well as a distal portion that extends from the first side edge to the distal ends of the arm portions. The proximal portion in these embodiments is longer than the distal portion.

Also highly desirable is where the second locking member also includes a projection that extends outward into the channel from the back wall of the channel. This projection defines a first chamber and second chamber, each of the chambers being in registry with one of the arm portions of the first locking member. The first chamber is sized to allow the first arm portion to be inserted into the channel without it contacting the first chamber except if it should be deflected within the channel. These embodiments find the second latching member and the positioning member to be positioned within this first chamber. Most desirable is where the second chamber is sized so that it snugly receives the second arm portion. More highly preferred is when the positioning member is a deflecting-surface positioned upon the surface of the projection that is adjacent to (i.e., facing) the first chamber. The deflecting-surface is adapted to make contact with the first arm portion to deflect it away from the second arm portion when the first locking member is inserted into the second locking member.

Certain preferred embodiments of this invention find the first locking member, the second locking member and the positioning member to be unitary with the panel. More desirable is where the first side edge defines a first groove and the first locking member comprises a first fabricated insert securely mounted within that groove. Highly desirable forms of this embodiment are where, while the second locking member is unitary with the panel, the positioning member is a second fabricated insert securely mounted to the second locking member within the channel. Most preferred is when the second side edge defines a second groove and a second fabricated insert is securely mounted within this groove. This second fabricated insert includes both the second locking member and the positioning member. More highly desirable is where both grooves of the locking system are congruent by having substantially the same dimensions and both inserts are preferably polymeric.

Another aspect of this invention finds a locking system for the mechanical joining of at least two components of an article of construction. This system includes a first component having a first locking member, a second component having a second locking member, and at least one of the locking members being provided with a positioning member. The first locking member is located at a side edge of the first component and includes first and second flexible arm portions that are spaced apart from one another, the first arm portion including a first latching member. The second locking member is positioned along a side edge of the second component and defines a channel that is recessed within this side edge. The channel is sized to receive the arm portions without the arm portions having to contact the channel. The second locking member also includes a second latching member that is positioned and adapted to engage the first latching member. Insertion of the first locking member into the second locking member to join the first component to the second component allows the positioning member to deflect at least the first arm portion so that the first latching member becomes securely engaged with the second latching member.

Most desirable is where the first latching member is a first rib extending outward from the first arm portion and a second rib extending outward from the second arm portion. In these embodiments, the second latching member has first and second slots abutting the channel where each slot is sized to receive its corresponding rib. The positioning member is a wedge secured to the back wall of the channel. The wedge has first and second deflecting-surfaces, the first deflecting-surface being adapted to make contact with the first arm portion and the second deflecting-surface being similarly adapted to make contact with the second arm portion when the first locking member is inserted into the second locking member.

In certain preferred examples of this aspect of this invention, the first locking member is spaced beneath the outer surface of the first component and the second locking member is similarly spaced beneath the outer surface of the second component. Highly desirable is where the first and second components are substantially identical panels, preferably solid hardwood flooring panels. Each panel has first and second side edges adjacent to the outer surface on which are provided the first and second locking members respectively and each panel is one of a plurality of panels.

BRIEF DESCRIPTION OF THE DRAWINGS

FIG. 3 is a fragmentary exploded end view of another preferred panel in accordance with this invention having a second fabricated insert.

FIG. 4 is a fragmentary exploded end view of another preferred panel in accordance with this invention having a first fabricated insert.

DETAILED DESCRIPTION OF PREFERRED EMBODIMENTS

The figures illustrate preferred embodiments of an improved locking system 10 for mechanically joining together a plurality of components 12,14 to form an article of construction such as a floor or shelving. Components 12,14 are held together without utilizing an adhesive such as glue or fasteners such as nails or staples.

Figure 1:
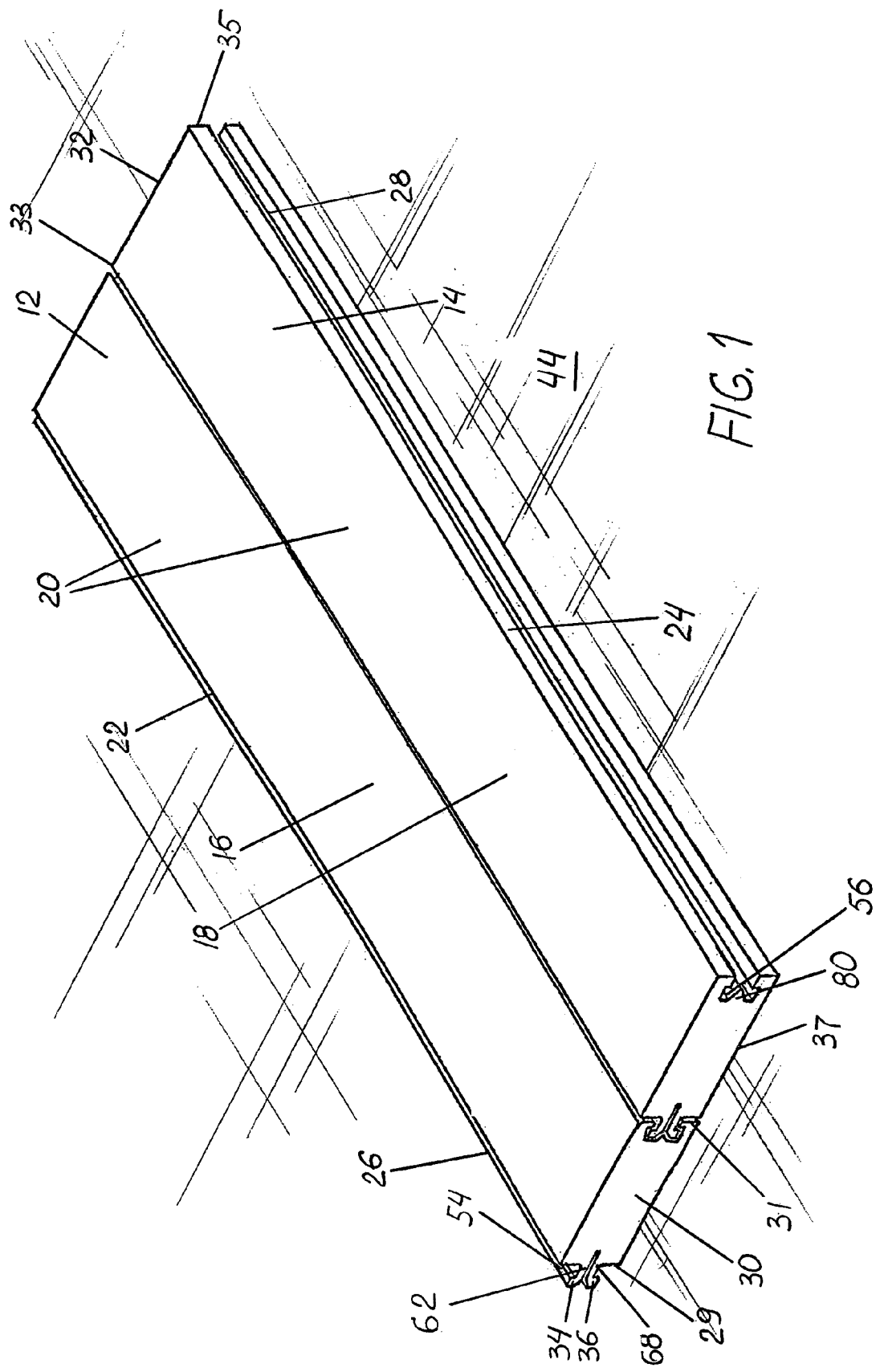
FIG. 1 is a perspective view of a preferred locking system in accordance with this invention having panels as the components.

FIG. 1 is a perspective view of components 12,14 joined by locking system 10 where components 12,14 comprise first and second panels 16,18. Each panel 16,18 has an outer surface 20, a first side edge 22, and a second side edge 24. Panels 16, 18 are provided with first and second locking members 26,28. As shown, first locking member 26 is positioned beneath outer surface 20 extending along the length of first side edge 22 from a first end 30 of each panel to its second end 32. First end 30 extends from first-edge point 29 to second-edge point 31. Second end 32 extends from first-edge point 33 to second-edge point 35. Second locking member 28 is also positioned beneath outer surface 20 and extends the entire length of second side edge 24. For reasons discussed below, locking members 26,28 need to be in registry when panels 16 and 18 are placed edge to edge but do not need to be centered beneath outer surface 18 and bottom surface 37 along its respective side edge 22,24. If desired, locking members 26,28 can therefore be positioned closer to bottom surface 37 of panel 16,18 than to outer surface 20. This adds strength to outer surface 20 by positioning more panel material directly beneath it.

Figure 2:
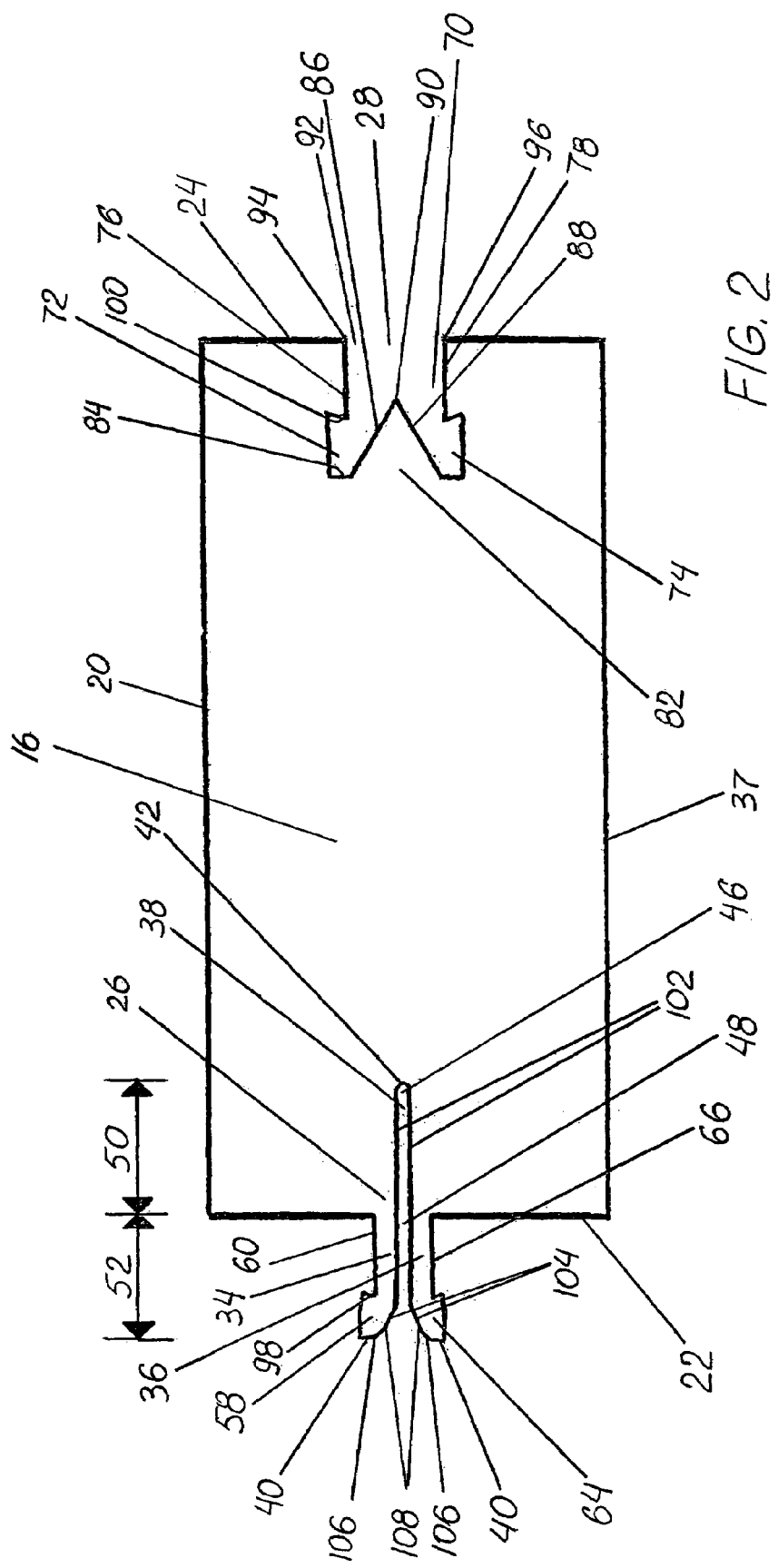
FIG. 2 is an end view of a panel in FIG. 1.

As illustrated in FIG. 2, first locking member 26 includes first and second arm portions 34,36. Each arm portion 34,36 extends outward from first side edge 22 in a substantially orthogonal manner. First arm portion 34 is spaced apart from second arm portion 36 by a notch or kerf 38 that extends from the distal end 40 of each arm portion 34,36 to a proximal-vertex 42 recessed within the panel 16,18.

Each arm portion 34,36 has sufficient length from first side edge 22 to its distal end 40 to enable the arm portions 34,36 to have the flexibility to bend upward or downward without destructive deformation when deflected. The selected length will vary depending upon the material comprising arm portions 34,36 and the inherent flexibility of that material. The terms "upward", "above", "downward", and "below" provide relative positioning with respect to a vertical dimension and are used here for ease in discussing the embodiments of the present invention depicted in FIGS. 1-6 where the panels 16,18 are shown oriented such that first and second side edges 22, 24 are vertical to the ground or surface 44 being paneled and outer surface 20 is horizontal to surface 44. One skilled in the art will readily recognize, however, that the present locking system can be used in any orientation whereby arm portions 34,36 bend in a plane substantially parallel to the plane of first side edge 22.

Kerf 38 is comprised of proximal and distal portions 46,48. Proximal portion 46 extends outward from proximal-vertex 42 to first side edge 22. Distal portion 48 extends outward from first side edge 22 to the distal end 40 of the particular arm portion 34,36 having the greatest length. As shown in FIG. 2, arm portions 34,36 have substantially equal lengths. Proximal length 50 of proximal portion 46 is greater than the distal length 52 of distal portion 48. Arm portions 34,36 have been found to have desirable flexibility when proximal portion 46 of kerf 38 is longer than its distal portion 48.

First locking member 26 is configured to include a first latching member 54. First latching member 54 includes a first rib 58 that protrudes outward and upward from upper surface 60 of first arm portion 34 at distal end 40. First rib 58 extends between first lateral edges 62 (only one being seen in FIG. 1) of first arm portion 34, thereby extending the length of first side edge 22, with distal end 40 running substantially equidistant from first side edge 22 along its length.

First latching member 54 also includes a similarly configured second rib 64 protruding outward and downward from lower surface 66 of second arm portion 36 at distal end 40. Second rib 64 extends between second lateral edges 68 (only one being seen in FIG. 1) of second arm portion 36. Second rib 64 also runs the entire length of first side edge 22 with its distal end 40 also running substantially equidistant from first side edge 22 along its length. As illustrated in FIGS. 1, 2 and 4, first arm portion 34 is above second arm portion 36. First and second ribs 58,64 are therefore aligned substantially opposite to each other given their location at the distal ends 40 of their respective arm portion 34,36 having equal length.

Second locking member 28 is shown in FIGS. 1 and 2 as including a channel 70 recessed within second side edge 24.

Channel 70 extends from first end 30 to second end 32 of panels 16,18. Second locking member 28 also includes second latching member 56. Second latching member 56 is comprised of first and second slots 72,74. First slot 72 is a space recessed within the upper surface 76 of channel 70. First slot 72 is spaced inward from second side edge 24 and runs from first end 30 to second end 32 in a path that is substantially parallel to second side edge 24. Second slot 74 is a similarly configured space recessed with the lower surface 78 of channel 70. Second slot 74 is also spaced inward from second side edge 24 so that second slot 74 is positioned directly below first slot 72. Second slot 74 extends from first end 30 to second end 32 in a path that is substantially parallel to first slot 72. Upper surface 76 is the surface of channel 70 closest to outer surface 20. Upper surface 76 and lower surface 78 lie in individual planes that are substantially parallel.

Second locking member 28 also has positioning member 80. As shown in FIGS. 1, 2 and 3, positioning member 80 is a wedge 82. Wedge 82 protrudes outward from the back wall 84 of channel 70 and extends from first end 30 to second end 32 of panels 16,18. Wedge 82 includes first and second deflecting-surfaces 86, 88. First deflecting-surface 86 is adjacent to and beneath first slot 72. First deflecting-surface 86 slopes downward or away from upper surface 76. Second deflecting-surface 88 is adjacent to and above second slot 74. Second deflecting-surface 88 slopes upward towards upper surface 76, meeting first deflecting-surface 86 at apex-edge 90. Apex-edge 90 is substantially parallel to second side edge 24 and equidistant from upper and lower surfaces 76,78. The angle between first deflecting-surface 86 and second deflecting-surface 88 at apex-edge 90 is preferably 57°.

In joining first panel 16 to second panel 18 using locking system 10, panels 16,18 are first positioned upon surface 44 so that outer surfaces 20 of both panels are facing outward and not down. In this orientation, second side edge 24 of first panel 16 is then placed adjacent to first side edge 22 of second panel 18 such that second locking member 28 of panel 16 is facing first locking member 26 of panel 18. Channel 70 has an opening 92 at second side edge 24 that extends from the outer edge 94 of upper surface 76 to the outer edge 96 of lower surface 78. Opening 92 is spaced beneath outer surface 20 to be in registry with arm portions 34,36 when second locking member 28 is facing first locking member 26 to insure that outer surface 20 of first panel 16 is coplanar with outer surface 20 of second panel 18 when the panels are joined. Opening 92 is furthermore sized to receive both arm portions 34,36 so that when first locking member 26 is inserted into second locking member 28 in a substantially horizontal direction to join first and second panels 16,18, arm portions 34,36 make no contact with second side edge 24 at outer edges 94,96.

Figure 5:
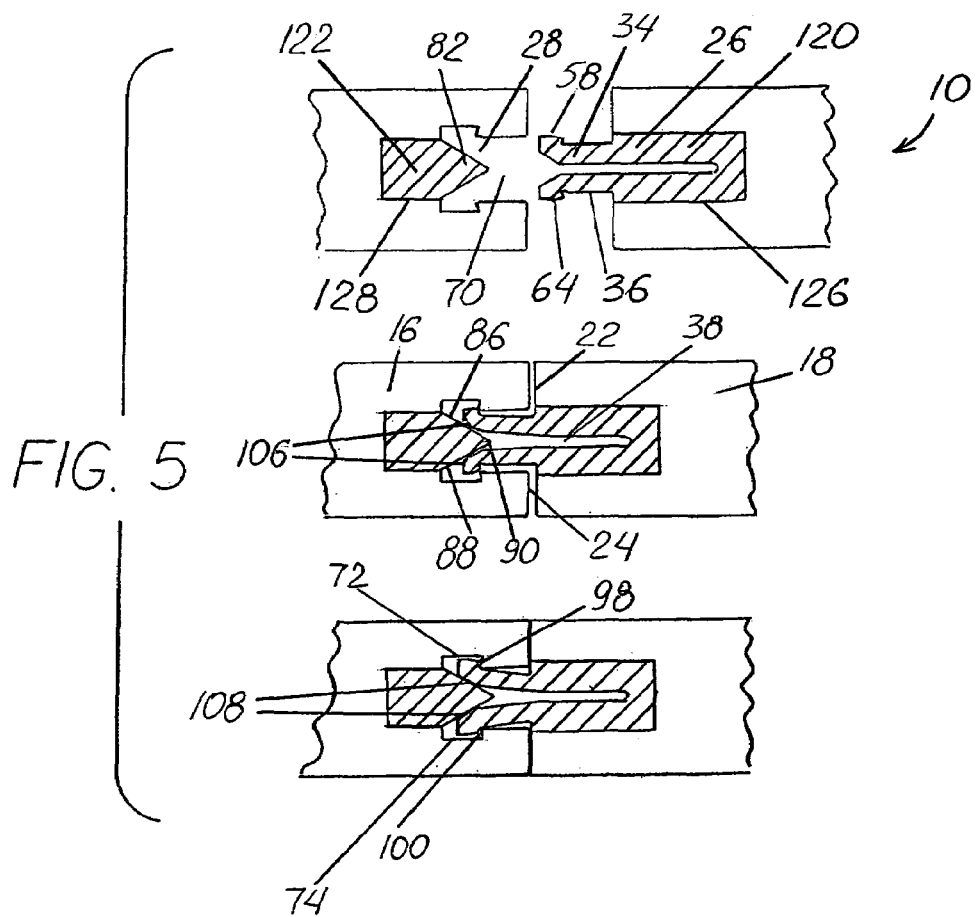
FIG. 5 is a series of fragmentary end views of other preferred panels in accordance with this invention having first and second fabricated inserts and illustrating a manner of operation of the locking system.

FIG. 5 illustrates the operation of locking system 10 in engaging first latching member 54 with second latching member 56 over three stages of the insertion on first locking member 26 into second locking member 28. Inserting arm portions 34,36 into channel 70 advances first and second ribs 58,64 towards wedge 82. Apex-edge 90 is in registry with kerf 38 so that initial contact of first arm portion 34 with second locking member 28 is between first rib 58 and first deflecting-surface 86. Likewise, initial contact between second arm portion 36 and second locking member 28 is by second rib 64 with second deflecting-surface 88.

Continued advancement of first locking member 26 into second locking member 28 results in deflection of first arm portion 34 in an upward direction by first deflecting-surface 86. First slot 72 is sized and positioned to receive first rib 58 within first slot 72 following continued upward deflection of flexible first arm portion 34 upon first deflecting-surface 86.

In a similar manner, second slot 74 is sized and positioned to receive second rib 64 within second slot 74 following continued downward deflection of flexible second arm portion 36 upon second deflecting-surface 88.

The length of each arm portion 34,36 is complementary to the spacing of the corresponding slot 72,74 from second side edge 24. This permits sufficient deflection of arm portions 34,36 by wedge 82 in order to achieve full engagement of ribs 58,64 within slots 72,74 upon advancement of first locking member 26 into second locking member 28 ending with first side edge 22 abutting second side edge 24. Locking system 10 thereby joins and holds together first panel 16 with second panel 18 at the joint between side edges 22,24. This eliminates the gapping from environmental expansion and contraction due to humidity since changes in the widths of the panels will not have any impact on their proximity to each other.

Each rib 58,64 has an outer rib-surface 98. Ribs 58,64 are configured such that rib-surface 98 has a contour that is complementary to the contour of the slot-surface 100 defined by each slot 72,74. As seen in FIG. 5, this insures substantial abutting contact between rib-surfaces 98 and slot-surfaces 100 when ribs 58,64 are inserted into and latched within slots 72,74 so that significant horizontal locking is achieved between first and second latching members 54,56.

First and second arm portions 34,36 are also provided with an inner surface 102. Inner surfaces 102 face kerf 38 between arm portions 34,36 and are opposite to the surfaces 60,66 on which first and second ribs 58,64 are positioned. Abutting each inner surface 102 at distal end 40 is contact-surface 104. Contact-surfaces 104 are located substantially opposite to their corresponding rib 58,64 and each includes a leading or distal edge 106.

Arm portions 34,36 and wedge 82 are configured so that initial contact with wedge 82 by either arm portion 34,36 is at its respective distal edge 106 when first locking member 26 is inserted into second locking member 28. As illustrated in FIGS. 2, 4 and 5, distal edges 106 have a convex surface that assists in minimizing frictional contact between arm portions 34,36 and their respective deflecting-surface 86,88 so as to allow each arm portion 34,36 to be deflected smoothly and with a minimal of force by the individual joining of panels 16 and 18.

Trailing behind each distal edge 106 is a proximal contact portion 108 of contact-surface 104. Contact portion 108 on each arm portion 34,36 is configured to have a slope that is complementary to the slope of the corresponding deflecting-surface 86,88. As seen in FIG. 5, each contact portion 108 is positioned upon the respective inner surface 102 so that the surface of contact portion 108 has substantially full abutting contact with the surface of the deflecting-surface 86,88 when deflection of arm portions 34,36 is complete and ribs 58,64 have been engaged within slots 72,74. This contiguous surface-to-surface contact insures that significant vertical locking is achieved between first and second latching members 54,56 that resists displacement such as when weight is later placed upon the outer surfaces 20 of the panels 16,18.

Figure 6:
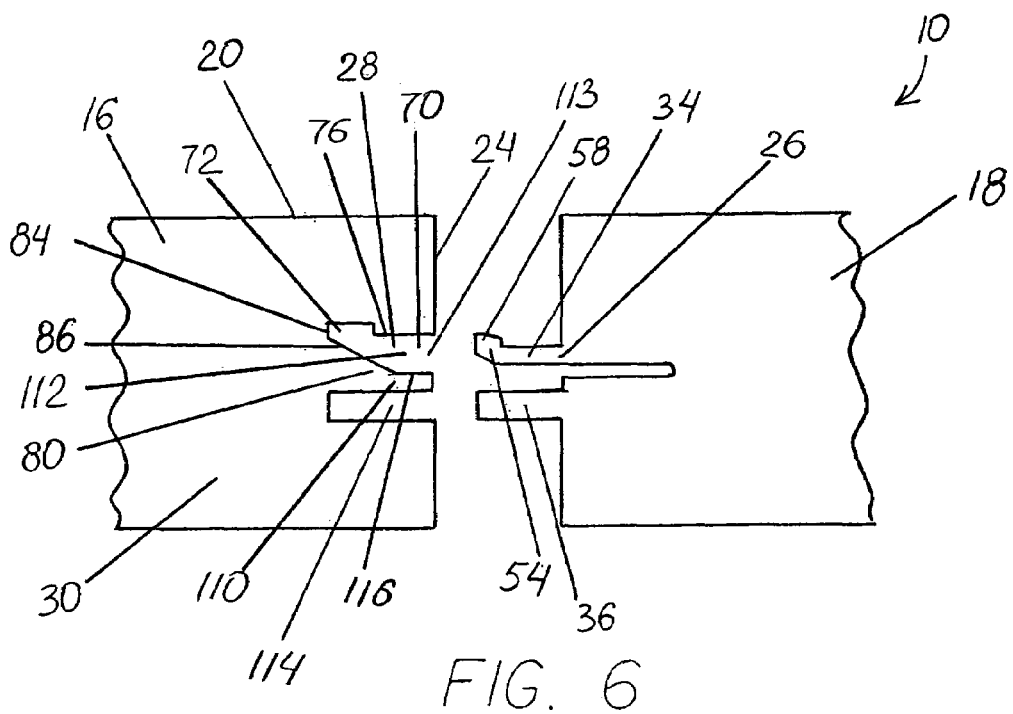
FIG. 6 is a fragmentary end view of other preferred panels in accordance with this invention having a second locking member with a projection.

Another preferred embodiment of the present locking system is illustrated in FIG. 6. Structures in this embodiment that are similar to structures identified in the description of the previous embodiment have been given reference numbers identical to the corresponding structures.

Second locking member 28 includes projection 110 that extends outward from back wall 84 into channel 70 towards opening 113. Projection 110 extends from first end 30 of panel 16 to second end 32, subdividing channel 70 into an upper first chamber 112 and a lower second chamber 114. Chambers 112,114 are spaced beneath outer surface 20 to be in registry with arm portions 34,36 of first locking member 26 on panel 18.

In this embodiment, first latching member 54 is limited to one rib 58 with which only arm portion 34 is provided. First chamber 112 is sized to receive arm portion 34 without arm portion 34 making contact with second side edge 24 when first locking member 26 is horizontally inserted into second locking member 28 to join panel 16 to panel 18. First chamber 112 is provided with slot 72 and deflecting-surface 86. Deflecting-surface 86 is a portion of a triangular positioning member 80 that is mounted in the rear of first chamber 112. Positioning member 80 has one wall abutting back wall 84, a second wall abutting the projection surface 116 facing first chamber 112, and deflecting-surface 86 having a planar surface sloping downward towards opening 113. Slot 72 is defined within upper surface 76 of first chamber 112 and is sized and positioned to receive and engage rib 58 upon full deflection of arm portion 34 by deflecting-surface 86 upon insertion of arm portion 34 into first chamber 112.

Second arm portion 36 serves as a stabilizing element when panel 16 is joined to panel 18. Second chamber 114 is dimensioned such that the vertical height of second chamber 114 is slightly greater than the vertical height of second arm portion 36. Second chamber 114 is therefore sized to snugly receive second arm portion 36 when inserted therein. Second arm portion 36 gives added vertical stability and strength when joining panel 16 to panel 18 using locking system 10.

One can readily see how the present invention provides an improved locking system 10 for joining solid hardwood flooring panels such as those illustrated as panels 16,18 in FIGS. 1-6. Solid hardwood paneling, especially ¾" solid flooring boards, can now be joined together despite their "crooks" or warps, since first locking member 26 does not have to be engaged to second locking member 28 along the panel's entire length at the same time. Quite to the contrary, the present locking system, by joining the locking members horizontally, allows an installer to first engage the paneling at one end with the remaining portion of each board being engaged as the installer moves along their length—one section at a time.

Locking system 10 also avoids unnecessary wear and damage to the paneling during the installation procedure. With opening 92 being sized so that arm portions 34,36 avoid contact with the edges or shoulders of channel 70 along second side edge 24, the fractures are eliminated that can occur with other interlocking systems—fractures that destroy the natural beauty of the face of the hardwood board and undermine the strength of the joint itself.

Installation of hardwood flooring using the present panel locking system 10 only requires the installer, from a standing position, to tap one board with a tapping block and hammer so that the board's first locking member 26 horizontally engages the second locking member 28 on a second board. This direct edge-to-edge manner of application is very similar in form to the installation of hardwood flooring today except that the installer needs only to strike each board with a block and hammer rather than fasten each down with a nail gun. The present glueless, floating panel locking system therefore eliminates the added labor previously needed to glue and/or nail the panels down as well as reduces the amount of clean-up required afterwards.

The profile of locking members 26,28 and positioning member 80, i.e., the contour of these structures in the embodiments described above, can be milled into the respective side edges 22,24 of panels 16,18, especially where the panels are made of solid or engineered hardwood. As seen in FIGS. 1 and 2, when locking members 26,28 and positioning member 80 are milled from panels 16,18, locking members 26,28 and positioning member 80 are unitary with panels 16,18 such that panels 16,18 including locking members 26,28 and positioning member 80 comprise a monolithic structure. While milling of first locking member 26 into first side edge 22 results in some loss of the full face or outer surface 20 in panels 16,18, there is no loss of the face in milling second locking member 28 including wedge 82 into second side edge 24. The resulting reduction in waste due to loss of the face of panels 16,18 is especially beneficial when the panels are boards made from solid and expensive hardwood.

As illustrated in FIGS. 3-5, the present locking system 10 can also avoid any loss of the face of solid hardwood paneling or difficulties associated with milling into side edges 22,24 by using fabricated inserts 118,120,122 as locking members 28, 26 and positioning member 80 respectively. These inserts 118,120,122 are mounted in grooves 124,126,128 that are formed within side edges 22,24. The fabrication of inserts 118,120,122 from a less expensive material having the desired flexibility, preferably a polymeric material, can be achieved using either an extrusion or molding process. A variety of other assembly procedures known to those skilled in the art can also be used. The choice of material will depend on the particular application being made of the locking system.

FIG. 3 shows that second fabricated insert 118 is sized to be snugly secured within second groove 124. Groove 124 is milled from second side edge 24 of panel 16. Second fabricated insert 118 is provided with first and second slots 72,74 and a wedge 82 so that insert 118, when mounted in second groove 124, can serve as the second locking member 28 on panel 16. Second fabricated insert 118 has a back surface 130 that is configured to have substantially similar outside dimensions to the back wall 132 of second groove 124 to achieve contiguous contact between the surfaces of insert 118 that are abutting surfaces of groove 124. Second fabricated insert 118 is rigidly mounted within second groove 124 using preferably either an adhesive such as glue or a fastener such as a nail. When fully inserted into second groove 124, front edges 134 of second fabricated insert 118 are coplanar with second side edge 24.

FIGS. 4 and 5 shows that first fabricated insert 120 is configured to be tightly secured within first groove 126. First groove 126 is milled from the first side edge 22 of panel 16 using a standard molder in a manner similar to that used in forming second groove 124 on the opposite side edge. Grooves 124,126 have substantially similar dimensions. This feature is desirable since it allows one, during assembly of panels 16 having locking system 10, to quickly choose either first or second groove 124,126 to receive first fabricated insert 120 so that the opposite groove 126,124 can then be used to receive second fabricated insert 118.

First fabricated insert 120 is provided with first and second arm portions 34,36 including first and second ribs 58,64 and kerf 38 separating arm portions 34,36. First fabricated insert 120, when mounted in first groove 126, can serve as the first locking member 26 on panel 16. First fabricated insert 120 has a back surface 130 that is configured to have substantially similar outside dimensions to the back wall 132 of first groove 126. This allows the surfaces of first fabricated insert 120 to achieve contiguous contact with the abutting surfaces of first groove 126. First fabricated insert 120 is rigidly mounted within first groove 126 also using either an adhesive or a fastener. When fully inserted into first groove 126, front edges 134 of first fabricated insert 120 are coplanar with first side edge 22.

Back surfaces 130 on fabricated inserts 118,120 are provided with a glue pot 133 (shown in phantom lines) to create space in which extra adhesive (when adhesive is used) can escape without allowing negative pressure to build up behind fabricated inserts 118,120. Glue pot 133 is preferably a semi-hemispheric cavity positioned at the center of back surface 130. During the fabrication process, glue pot 133 also serves to relieve undue stress placed upon the fabricated inserts 118,120.

FIG. 5 presents an embodiment where second locking member 28 is milled from panel 16 but wedge 82 is second fabricated insert 122 set in groove 128. Groove 128 is configured so that when insert 122 is rigidly mounted therein, deflecting-surfaces 86,88 remain outside groove 128, extending outward into channel 70 from back wall 84. Panel 18 is shown in FIG. 5 having a first locking member 26 formed from first fabricated insert 120 secured within first groove 126.

Figure 7:
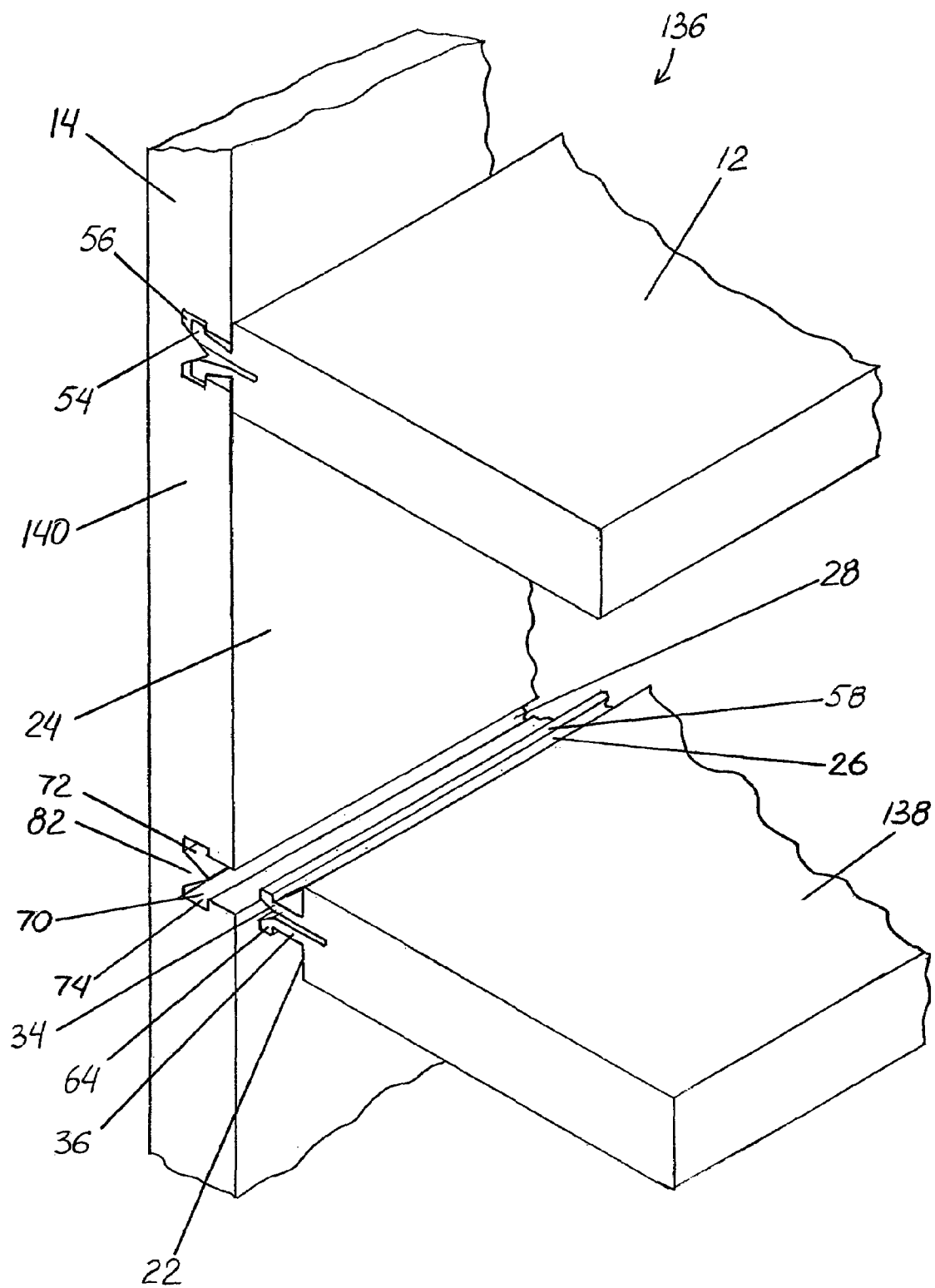
FIG. 7 is a perspective view of another preferred locking system in accordance with this invention having shelving as the components.

Although the embodiments described above have been in conjunction with floor paneling, the present invention allows for the mechanical joining of components for several types of construction. Such applications can include paneling for walls and ceilings and also shelving. As illustrated in FIG. 7, shelving 136 has a first component 12 such as a shelf 138 provided with first locking member 26 in accordance with the present invention along its first side edge 22. First locking member 26 includes first and second arm portions 34,36 having ribs 58,64 at the distal ends of the arm portions 34, 36 to serve as a first latching member 54.

Shelving 136 is also provided with a second component 14 or vertical support member 140 having a second locking member 28 in accordance with the present locking system mounted to its second side edge 24. Second locking member 28 has channel 70 sized to receive arm portions 34,36 recessed within second side edge 24. Channel 70 defines slots 72,74 to serve as a second latching member 56 and includes wedge 82.

In operation, inserting first locking member 26 into second locking member 28 will result in arm portions 34,36 being deflected by wedge 82 so that ribs 58,64 become securely engaged in slots 72,74, thereby locking the shelf 138 to the vertical support 140. Channel 70 is configured so that arm portions 34,36 make no contact with channel 70 until deflected by wedge 82.

Although the embodiments seen in FIGS. 1-7 depict first latching member 54 as ribs 58,64 at the distal ends 40 of arm portions 34,36, one can readily see that ribs 58,64 could also be positioned such that they are spaced back from distal ends 40 along upper and lower surfaces 60,66. Such placement of ribs 58,64 would also include corresponding repositioning of slots 72,74 closer to opening 92 for receiving and engaging ribs 58,64 when attaching first locking member 26 to second locking member 28.

Rather than ribs 58,64, one will also recognize that first latching member 54 could be slots defined by upper and lower surfaces 60,66 of first and second arm portions 34,36 respectively. This modification would include the corresponding change in second latching member 56 from slots to ribs that extend outward from upper and lower surfaces 76,78 into channel 70.

While the embodiments depicted in the drawings and described above have second locking member 28 provided with positioning member 80, a wedge-like positioning member could also be provided for first locking member 26 in accordance with the present invention. Such a positioning member could be attached to the distal ends 40 of both arm portions 34,36 by either a thin plastic membrane created during fabrication of first locking member 26 or by spot gluing. When first locking member 26 is then inserted into second locking member 28, this positioning member breaks away from arm portions 34,36 upon striking the back wall 84 of channel 70, thereby allowing arm portions 34,36 to be deflected to engage ribs 58,64 in slots 72,74.

Those skilled in the art will immediately recognize how the present invention enables solid hardwood flooring to be installed without glue or other external fasteners and floated over concrete or any other type of sub-floor. Unlike many previous systems for installing hardwood boards, this manner of installation thus allows sound retardant as well as moisture barriers to be placed between the flooring panels and any sub-floor beneath them, including a concrete slab. The present locking system can therefore be seen to provide a glueless floating installation system for all structural paneling that offers not only excellent stability but a more rapid mode of installation that represents less time and cost to the homeowner.

Although the invention have been shown and described in conjunction with specific embodiments thereof, it is to be understood that many alternatives, modifications and variations will be apparent to those skilled in the art. Accordingly, it is intended to embrace all such alternatives, modifications and variations that fall within the spirit and broad scope of the appended claims.

The invention claimed is:

1. A panel locking system for mechanical joining of a plurality of panels, each panel comprising:
    first and second outer surfaces and first and second side edges adjacent to the outer surfaces;
    the first side edge being provided with a first locking member spaced between the outer surfaces, the first locking member having first and second spaced apart arm portions, at least the first arm portion being flexible and including an outward facing first latching member;
    the second side edge being provided with a second locking member spaced between the outer surfaces, the second locking member defining a channel recessed within the second side edge and having a second latching member positioned and adapted to engage the first latching member; and
    at least one locking member being provided with a positioning member, whereby inserting the first locking member on a first panel of the plurality into a second locking member on a second panel of the plurality to join the first panel to the second panel permits the positioning member to deflect the first arm portion so as to securely engage the first latching member with the second latching member, the channel of the second locking member being sized to receive the arm portions of the first locking member without the arm portions contacting the channel absent deflection of one of the arm portions and the channel being in registry with the arm portions such that at least one of the outer surfaces of the first panel is substantially coplanar with an outer surface of the second panel when the panels are joined.

2. The system of claim 1 wherein the positioning member is a wedge with at least one deflecting-surface, the deflecting-surface making contact with the first arm portion and deflecting the first arm portion away from the second arm portion upon inserting the first locking member into the second locking member.

3. The system of claim 2 wherein the wedge is positioned within the channel.

4. The system of claim 3 wherein the channel includes a back wall and the wedge abuts the back wall.

5. The system of claim 2 wherein the first latching member is at least one rib extending outward from the first arm portion and the first arm portion has a distal end with a contact-surface at the distal end abutting a surface of the first arm portion opposite to the rib.

6. The system of claim 5 wherein the contact-surface has a distal edge and the distal edge makes initial contact with the deflecting-surface upon inserting the first locking member into the second locking member.

7. The system of claim 1 wherein the first latching member is at least one rib extending outward from the first arm portion and the second latching member is at least one slot abutting the channel, the slot being sized to receive the rib.

8. The system of claim 7 wherein the rib is a first rib, the first latching member further comprises at least one second rib extending outward from the second arm portion, and the second latching member further comprises at least first and second slots abutting the channel, each slot being sized to receive the corresponding rib.

9. The system of claim 8 wherein the first side edge has a length extending between two first-edge points, the second side edge having a length extending between two second-edge points, the ribs extend the length of the first side edge, and the slots extend the length of the second side edge.

10. The system of claim 8 wherein the first rib is positioned on an upper surface of the first arm portion and the second rib is positioned on a lower surface of the second arm portion.

11. The system of claim 10 wherein the first and second ribs are aligned substantially opposite to each other.

12. The system of claim 11 wherein each of the first and second arm portions have a distal end and the first and second ribs are positioned at the respective distal end.

13. The system of claim 12 wherein the first slot is recessed within an upper surface of the channel and has a slot-surface, the second slot is recessed within a lower surface of the channel and has a slot-surface, and each rib has a rib-surface that is configured to substantially abut the corresponding slot-surface.

14. The system of claim 1 wherein the arm portions are spaced apart by a kerf, each of the arm portions extends outward from the first side edge to a distal end, and the kerf extends between the distal ends and a proximal-vertex recessed within the panel.

15. The system of claim 14 wherein the kerf has a proximal portion extending from the proximal-vertex to the first side edge and a distal portion extending from the first side edge to the distal ends of the arm portions, each portion having a length and the proximal length being greater than the distal length.

16. The system of claim 1 wherein the second locking member further includes a projection extending outward into the channel from a back wall of the channel, the projection defining a first chamber and second chamber, each of the chambers being in registry with one of the arm portions, the first chamber being sized to receive the first arm portion without the first arm portion contacting the first chamber absent deflection of the first arm portion, and the second latching member and the positioning member being positioned within the first chamber.

17. The system of claim 16 wherein the second chamber is sized to snugly receive the second arm portion.

18. The system of claim 16 wherein the positioning member is a deflecting-surface abutting a surface of the projection adjacent to the first chamber, the deflecting-surface making contact with the first arm portion and deflecting the first arm portion away from the second arm portion upon insertion of the first locking member into the second locking member.

19. The system of claim 1 wherein the first locking member, the second locking member and the positioning member are unitary with the panel.

20. The system of claim 1 wherein the first side edge defines a first groove and the first locking member is a first fabricated insert securely mounted within the groove.

21. The system of claim 20 wherein the second locking member is unitary with the panel and the positioning member is a second fabricated insert securely mounted to the second locking member within the channel.

22. The system of claim 20 wherein the second side edge defines a second groove and a second fabricated insert is securely mounted within the second groove, the second fabricated insert including the second locking member and the positioning member.

23. The system of claim 22 wherein the first and second grooves have substantially similar dimensions.

24. The system of claim 22 wherein the inserts are polymeric.

25. The system of claim 1 wherein each panel is a solid hardwood flooring panel.

* * * * *